(12) United States Patent
Chang et al.

(10) Patent No.: US 8,199,888 B2
(45) Date of Patent: Jun. 12, 2012

(54) SYSTEM AND METHOD FOR AUTOMATICALLY TRANSCRIBING VOICEMAIL

(75) Inventors: Hisao M. Chang, Cedar Park, TX (US); Xiaolian Bi, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 859 days.

(21) Appl. No.: 12/328,370

(22) Filed: Dec. 4, 2008

(65) Prior Publication Data

US 2010/0142684 A1 Jun. 10, 2010

(51) Int. Cl.
*H04M 11/00* (2006.01)
(52) U.S. Cl. ............... 379/88.14; 379/88.25; 455/413
(58) Field of Classification Search ............ 379/88.13, 379/88.14, 88.22–88.25
See application file for complete search history.

(56) References Cited

U.S. PATENT DOCUMENTS

| 6,604,124 | B1 * | 8/2003 | Archbold ............... 718/103 |
| 6,775,651 | B1 * | 8/2004 | Lewis et al. ............... 704/235 |
| 8,064,576 | B2 * | 11/2011 | Skakkebaek et al. ...... 379/88.13 |
| 2008/0240380 | A1 * | 10/2008 | Siminoff ............... 379/88.13 |

* cited by examiner

*Primary Examiner* — Simon Sing

(57) ABSTRACT

Disclosed herein are systems, computer-implemented methods, and tangible computer-readable media for automatically transcribing voicemail. The method includes receiving a plurality of voicemail messages from callers, identifying for each voicemail message in the plurality of voicemail messages a first frequency with which the respective caller leaves voicemails, identifying for each voicemail message in the plurality of voicemail messages a second frequency with which a user requests transcription of each voicemail, assigning a priority ranking to each voicemail message in the plurality of voicemail messages based on the respective first frequency and the respective second frequency, and transcribing untranscribed voicemail messages with a highest priority ranking. The method can include establishing a priority ranking threshold and repeatedly transcribing a next highest ranking untranscribed voicemail message until no further untranscribed voicemail messages remain above the priority ranking threshold.

20 Claims, 3 Drawing Sheets

US 8,199,888 B2

SYSTEM AND METHOD FOR AUTOMATICALLY TRANSCRIBING VOICEMAIL

BACKGROUND OF THE INVENTION

1. Field of the Invention

The present invention relates to voicemail and more specifically to automatically transcribing voicemails according to priority.

2. Introduction

Telecommunications companies often provide voicemail services for customers. A typical voicemail service allows callers to record voice messages for later playback by the telephone customer. One specialized feature of voicemail service is transcribing voicemails so that telephone customers can understand messages more clearly, read messages faster, and even copy and paste information from the message. However, transcribing each stored voicemail is an enormous computational task even for high powered mainframes or clusters of computers because of the crushingly high volume of voicemails recorded every day. For example, if a telecommunications company has 200,000 customers with voicemail boxes, and only 25% of those receive an average of 2 voicemails per day that are an average of 45 seconds long, the voicemail system receives roughly 1250 hours' (just over 52 days') worth of voicemail per day. Thus, for this very modest scenario, a transcription computing device would need to transcribe emails roughly 52 times faster than real time in order to keep up with received voicemails. Installing, configuring, maintaining, and powering computer systems sufficiently powerful to transcribe and store all received voicemails in advance is expensive and time consuming.

In addition, transcription is not needed in every case. Only a subset of telephone customers request transcriptions. The remaining unrequested transcriptions are essentially wasted and provide little or no benefit for telephone customers at a great burden to the telecommunications company.

One approach in the art to solve these problems is to transcribe voicemails on demand. On-demand transcriptions solve the problem of wasted computational effort performing unnecessary transcriptions, but they have an additional problem of being slow. On-demand transcriptions can perform somewhat faster with less computation, but they trade speed for reduced accuracy. Accordingly, what is needed in the art is an improved way to transcribe voicemails.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for automatically transcribing voicemail. The method includes receiving a plurality of voicemail messages from callers, identifying for each voicemail message in the plurality of voicemail messages a first frequency with which the respective caller leaves voicemails, identifying for each voicemail message in the plurality of voicemail messages a second frequency with which a user requests transcription of each voicemail, assigning a priority ranking to each voicemail message in the plurality of voicemail messages based on the respective first frequency and the respective second frequency, and transcribing untranscribed voicemail messages with a highest priority ranking. In one aspect, the method repeatedly transcribes the next highest ranking untranscribed voicemail messages until no further untranscribed voicemail messages remain. The method can include establishing a priority ranking threshold and repeatedly transcribing a next highest ranking untranscribed voicemail message until no further untranscribed voicemail messages remain above the priority ranking threshold. In one variation, the method further generates speaker-specific syllable libraries while transcribing voicemail messages, receives incoming text-based messages from a speaker, and reads aloud the incoming text-based message using the speaker-specific syllable library associated with the speaker.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
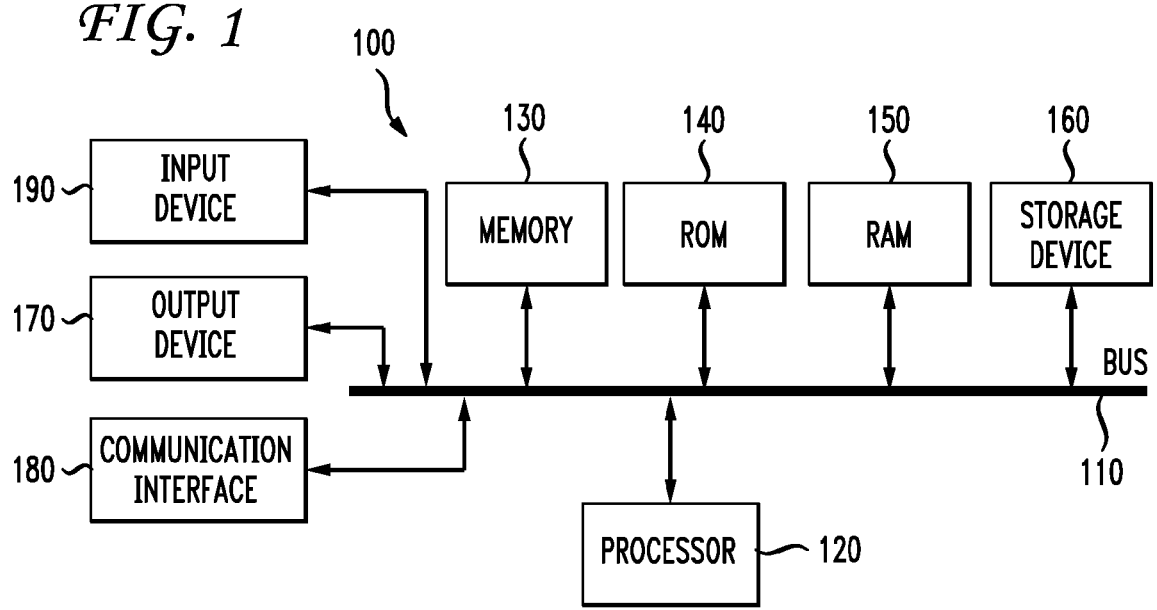
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
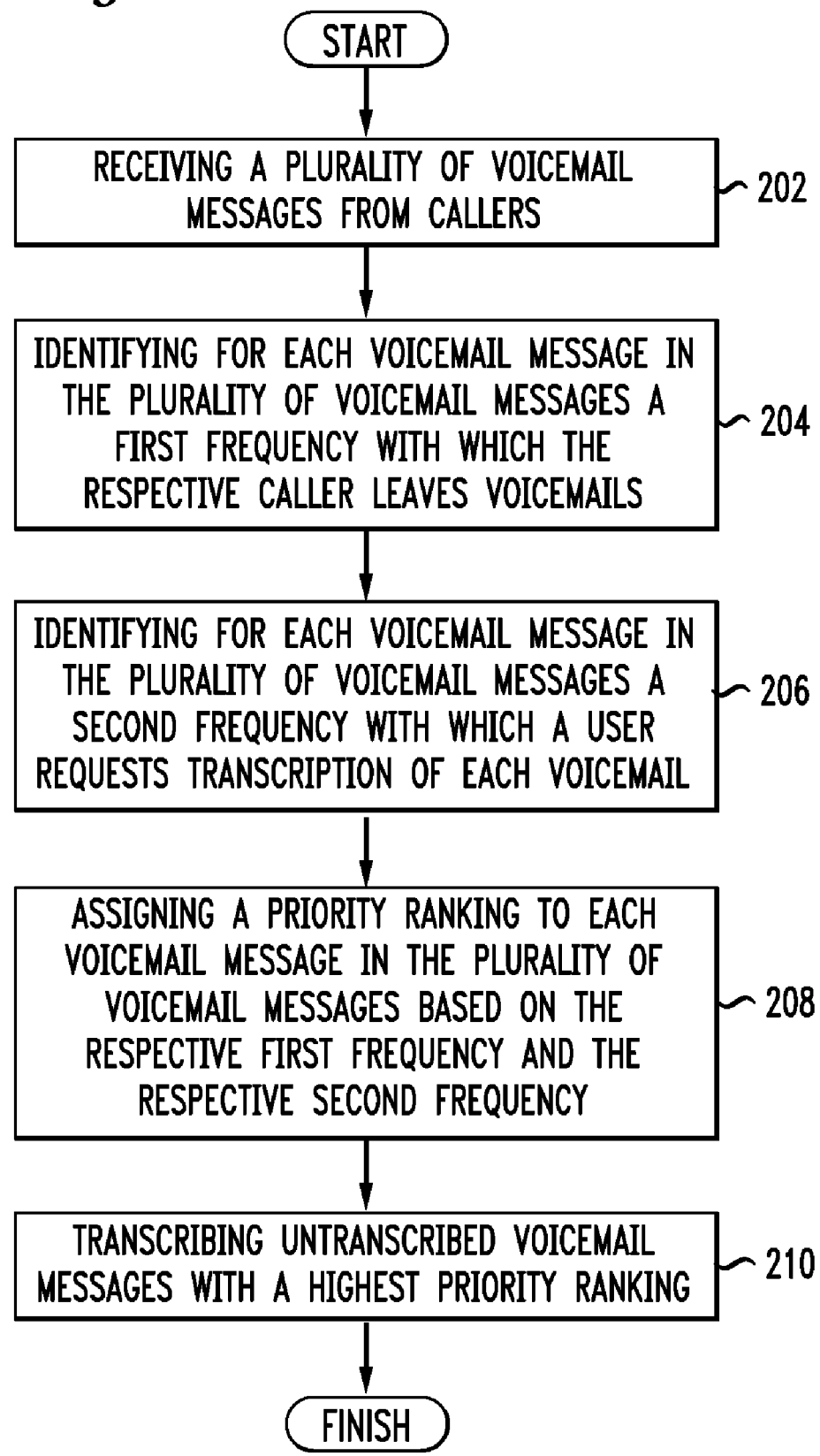
FIG. 2 illustrates an example method embodiment.

Having disclosed some fundamental system components, the disclosure turns to the exemplary method embodiment for transcribing voicemail as illustrated in FIG. 2. For clarity, the method is discussed in terms of a system configured to practice the method. The system receives a plurality of voicemail messages from callers (202). The system can be a voicemail server for a telecommunications company or a small business. The system can receive voicemail messages left through a telephone as well as through email or voice over IP (VoIP). In one typical scenario, callers attempt to dial a telephone company customer, but the customer is unavailable or does not answer the telephone call. The server prompts the caller to leave a message and records an audio message from the caller for the customer.

The system identifies two frequencies upon which to base a priority for each voicemail. First, the system identifies for each voicemail message in the plurality of voicemail messages a first frequency with which the respective caller leaves voicemails (204). This frequency indicates how often this particular caller leaves voicemails. Second, the system identifies for each voicemail message in the plurality of voicemail messages a second frequency with which a user requests transcription of each voicemail (206). This frequency indicates how often the telephone customer requests transcription, whether explicitly or otherwise. The system can either calculate these frequencies anew for each voicemail or the system can maintain a table showing how often each user requests voicemail transcriptions and/or how often each caller leaves voicemails. The first time the system transcribes a voicemail from a caller, the transcription can be slow and in real time if the system has not transcribed voicemail from that caller before. The system can preemptively transcribe later messages from the same caller because each transcription increases the ranking and/or the frequency for that caller.

The system assign a priority ranking to each voicemail message in the plurality of voicemail messages based on the respective first frequency and the respective second frequency (208). In one embodiment, the priority ranking is a number, with higher numbers being high priority and lower numbers being low priority, or vice versa. Depending on the desired granularity, the system can allocate more or less bits to store the priority ranking. For example, if the system allocates 4 bits, the system can store $2^4=16$ priority ranking levels. The priority ranking reflects the two frequencies above. For example, if one customer requests voicemail transcriptions for every single voicemail message, the system assigns a very high priority ranking to voicemails in that customer's voicemail box. The system prioritizes voicemails in the system using the priority ranking in order to determine which voicemails most likely require transcription. In one aspect, the system assigns priority further based on a user profile. For example, a customer can set up preferences for the system to transcribe every voicemail received between 9 a.m.

and 5 p.m. on Tuesdays and Thursdays, no voicemails from unknown callers, or only those voicemails older than 24 hours.

The system can keep track of untranscribed voicemails with a priority queue data structure storing pointers to respective voicemails in a database. A traditional queue data structure pushes new objects on the back of the queue and pops objects off the front of the queue. A traditional queue processes objects "first in, first out", meaning that objects that are in the queue the longest are processed first. A priority queue processes objects not based on time in the queue, but rather on priority ranking. The system can take in to account other variables in addition to the two frequencies when assigning priority rankings to voicemails, such as time in the queue, whether or not the voicemail contains information which would be useful to copy and paste (such as an home address, email address, or phone number), or listening to voicemail on a device where copying and pasting is available (such as an Apple iPhone or a personal computer).

The system transcribes untranscribed voicemail messages with a highest priority ranking (210). This process can be called anticipatory preemptive transcription. Once the system determines the highest value voicemails, the system transcribes the highest priority voicemails first. The system can store transcribed voicemail messages for later retrieval. In one embodiment, the system repeatedly transcribes the next highest ranking untranscribed voicemail messages until no further untranscribed voicemail messages remain. In this way, the system repeatedly processes the queue until the queue is empty and all voicemail messages are transcribed. The system devotes processing resources to high priority voicemail messages as they are received and works through the lower priority ones when the high priority ones are completed. In yet another variation, the system establishes a priority ranking threshold, and repeatedly transcribes a next highest ranking untranscribed voicemail message until no further untranscribed voicemail messages remain above the priority ranking threshold. The system can determine, for example, that the chances of needing a transcription of voicemail messages below a certain priority ranking are so low that the system can safely ignore them. The principles described herein can be used in combination with a translation engine to translate transcriptions into different languages.

The system can further build a voice model of a respective caller while transcribing voicemail messages and transcribe additional voicemail messages from the respective caller with the voice model. A tailored voice model of a specific caller enables the system to recognize speech faster and with greater accuracy. Voice models can be tied to a specific caller with a unique identifier such as a telephone number.

In one variation, the system further generates speaker-specific syllable libraries while transcribing voicemail messages, receives incoming text-based messages, such as emails, text messages, and instant messages, from a speaker, and reads aloud the incoming text-based message using the speaker-specific syllable library associated with the speaker. In this way, the system can extract a supplementary benefit from the computational work done to transcribe voicemails. Emails and text messages can sound more personal when the system plays them in the voice of the sender instead of a generic synthetic voice. This variation can be useful for listening to email over a traditional phone, a cell phone without an Internet connection, an Internet-enabled cell phone with a screen too small to comfortably read email, or over a Bluetooth headset when driving a vehicle.

Figure 3:
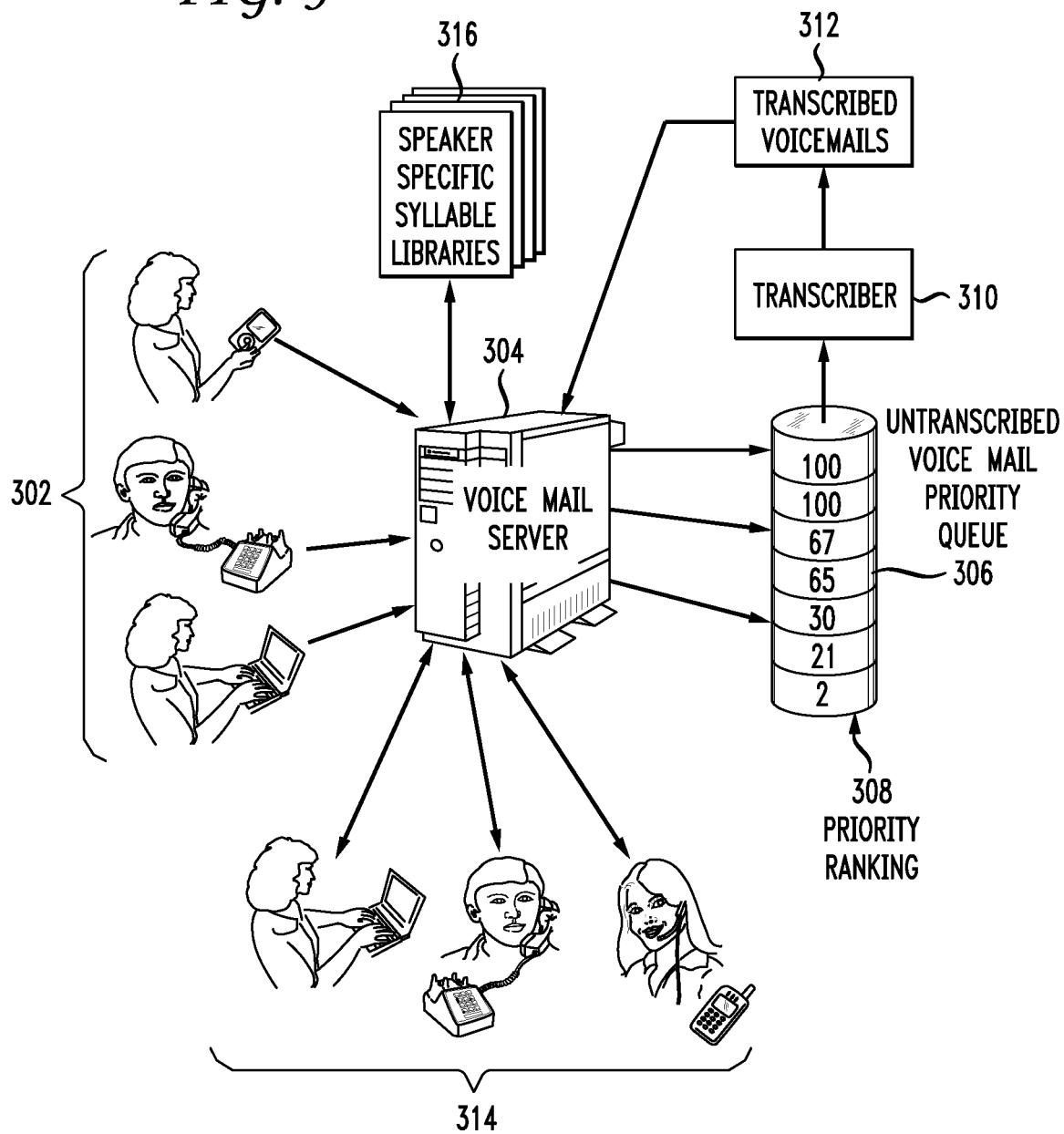
FIG. 3 illustrates an example voicemail transcription system.

FIG. 3 illustrates an example voicemail transcription system 300. The system 300 receives voicemails from callers 302. Callers can leave voicemails through cellular phones, voice over IP (VoIP) phones, landline phones, and even computers. The voicemail server 304 receives the voicemails. The voicemail server keeps track of how often a particular caller leaves voicemails and how often called parties request transcription. The server 304 uses these two variables to determine a priority ranking 308 for each voicemail. The priority ranking can be a single number that reflects the two-dimensions of transcription frequency and caller frequency. For instance, the system can assign a high priority ranking 308 to a voicemail addressed to a user who transcribes 89% of his incoming voicemails. The server 304 pushes incoming voicemails on an untranscribed voicemail priority queue 306 in order of priority.

In some system configurations, voicemail messages with the lowest priority rankings may never get transcribed because of limited system resources. Furthermore, because many of those low-priority voicemail messsages come from unknown numbers, the customer might never explicitly request a transcription. Accordingly, such voicemails can sit at the bottom of the queue forever since high-priority voicemail messages keep coming. To remedy this issue, the system can include a "periodic words spotting" module. The periodic words spotting module can operate on voicemail messages which have been in the queue for some threshold period of time, such as 24 hours, 2 days, or 1 week. The periodic words spotting module can operate according to the following steps. First, the periodic words spotting module stamps every voicemail message in the queue to indicate the date and time the system inserted the voicemail message into the queue. Second, the periodic words spotting module stamps every voicemail message in the queue with a waiting stamp to indicate a future time at which the system will take an action for this voicemail message. Third, the periodic words spotting module scans the waiting stamp of all voicemail messages in the queue at an off-peak hour, such as 2 a.m. If the date indicated by the waiting stamp has passed for a voicemail message, the system selects that voicemail message. If multiple waiting stamp dates have passed, the system selects voicemail messages in the order of their entry stamps. If multiple voicemails have the same waiting stamp, the system selects those that have never been transcribed first. If still more items match the selection sequence, the system selects them in a random order.

Fourth, the periodic words spotting module selects the key words from a profile of personal interests constructed for the person or a group of persons who are the recipients of the incoming voicemail messages. This profile of personal interests can contain a list of words and/or phrases unique to their life, conversations, or business such as school names, city names, client names, certain dates, product names, etc. Fifth, the periodic words spotting module performs a fast scan of the entire voicemail message for each selected message in order to spot words and/or phrases in the profile of personal interests to produce a chain of words spotted in the voicemail message in a sequence they are found. Some example chains of words are "Central High, Springfield, 1984", "Barcelona, Spain", and "soccer, fishing, Yellowstone". In a sense, the system transcribes this type of low-priority voicemail message as a selected list of words rather than a word-by-word level as the system currently does for other high-priority voicemail messages. In this way, the system performs a shortened transcription of the lower priority voicemail which uses a fraction of the system resources required for a normal full-text transcription.

The profile of personal interests for the customer can be created from multiple sources, such as interests explicitly defined by the customer, such as through an automated interview process, and interests extracted based on high frequency words in user communications, such as voicemails, text messages, or emails, over a certain time period, such as the last 12 months.

A transcriber module 310 pops the highest priority message from the top of the priority queue 306 and transcribes it. The transcriber 310 stores transcribed voicemails 312, which can include voicemail and text or just text. The transcriber 310 can record speaker-specific syllable libraries 316, effectively storing the building blocks for generating speech in the voice of the caller. The voicemail server 304 retrieves transcribed voicemails 312 when requested by customers 314. If a customer requests a transcription which is unavailable, the system can insert the voicemail with a maximum priority in the priority queue 306 so the transcriber 310 processes the requested transcription as soon as possible.

In another aspect, the voicemail server 304 also receives text-based messages for customers, such as email or short message service (SMS) messages (commonly known as text messages). The server 304 can synthesize speech using the speaker-specific syllable library 316 for the sender of the message to read aloud the text-based message in the voice of the sender. As an example, Mike leaves Nathan a voicemail. The system transcribes Mike's voicemail and generates a syllable library for Mike. Later, Mike sends Nathan (or someone else) an email. The system can generate speech which reads the email aloud in Mike's voice based on Mike's syllable library.

In one aspect, the system can further shorten, compress, or summarize text and voice messages. The system can remove certain words without detracting from the overall meaning of the message or replace certain words with something more concise. The system can replace "filler" words such as um, like, you know, uh, really, and just. For instance, the system can compress a voicemail message "Harry, it was great to see you. Let's get together. I think we should go to dinner later" to say "Harry . . . great to see you . . . Let's . . . go to dinner later". Another example is a voicemail message where the caller repeats the phrase "interest rates" more than ten times in 40 seconds. The system can abbreviate the entire message to just the key word or phrase, "interest rates". The system can compress text-based messages by substituting commonly used acronyms and/or abbreviations, such as GTG (got to go), IANAL (I am not a lawyer), IM (instant message), and FWIW (for what it's worth). The system can maintain or download updated acronyms and/or abbreviations. The system can also generate acronyms based on usage. When the system encounters unrecognized acronyms, the system can guess its meaning based on context and/or the system can ask the sender and/or the receiver what the unrecognized acronym means. With a centralized system for processing text and voice messages, when one person introduces or updates an unrecognized acronym, the system can then use the new acronym for all users. In one embodiment where the system displays emails on a computer screen, the system can make shortened text expandable to the original text upon some user input, such as a click, speech input, or mouse gesture. These message compression techniques can also be applied to web pages, bulletin boards, or other bodies of text as well.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to voicemail in the traditional telephone company sense as well as voicemail left as attachments in an email inbox. Those skilled in the art will readily recognize various modifications and changes that may be made to the present invention without following the example embodiments and applications illustrated and described herein, and without departing from the true spirit and scope of the present invention.

We claim:
1. A computer-implemented method of automatically transcribing voicemail, the method comprising:
receiving a plurality of voicemail messages from callers;
identifying for each voicemail message in the plurality of voicemail messages a first frequency with which the respective caller leaves voicemails;
identifying for each voicemail message in the plurality of voicemail messages a second frequency with which a user requests transcription of each voicemail;

assigning a priority ranking to each voicemail message in the plurality of voicemail messages based on the respective first frequency and the respective second frequency; and transcribing untranscribed voicemail messages with a highest priority ranking.

2. The computer-implemented method of claim 1, the method further comprising repeatedly transcribing next highest ranking untranscribed voicemail messages until no further untranscribed voicemail messages remain.

3. The computer-implemented method of claim 1, the method further comprising:

establishing a priority ranking threshold; and repeatedly transcribing a next highest ranking untranscribed voicemail message until no further untranscribed voicemail messages remain above the priority ranking threshold.

4. The computer-implemented method of claim 1, the method further comprising:

generating speaker-specific syllable libraries while transcribing voicemail messages;

receiving incoming text-based messages from a speaker; and reading aloud the incoming text-based message using the speaker-specific syllable library associated with the speaker.

5. The computer-implemented method of claim 1, the method further comprising building a voice model of a respective caller while transcribing voicemail messages.

6. The computer-implemented method of claim 5, the method further comprising transcribing additional voicemail messages from the respective caller with the voice model.

7. The computer-implemented method of claim 1, the method further comprising storing transcribed voicemail messages for later retrieval.

8. The computer-implemented method of claim 1, wherein assigning the priority ranking is further based on a user profile.

9. A system for automatically transcribing voicemail, the system comprising:

a module configured to receive a plurality of voicemail messages from callers;

a module configured to identify for each voicemail message in the plurality of voicemail messages a first frequency with which the respective caller leaves voicemails;

a module configured to identify for each voicemail message in the plurality of voicemail messages a second frequency with which a user requests transcription of each voicemail;

a module configured to assign a priority ranking to each voicemail message in the plurality of voicemail messages based on the respective first frequency and the respective second frequency; and a module configured to transcribe untranscribed voicemail messages with a highest priority ranking.

10. The system of claim 9, the system further comprising a module configured to repeatedly transcribe next highest ranking untranscribed voicemail messages until no further untranscribed voicemail messages remain.

11. The system of claim 9, the system further comprising:

a module configured to establish a priority ranking threshold; and a module configured to repeatedly transcribe a next highest ranking untranscribed voicemail message until no further untranscribed voicemail messages remain above the priority ranking threshold.

12. The system of claim 9, the system further comprising:

a module configured to generate speaker-specific syllable libraries while transcribing voicemail messages;

a module configured to receive incoming text-based messages from a speaker; and a module configured to read aloud the incoming text-based message using the speaker-specific syllable library associated with the speaker.

13. The system of claim 9, the system further comprising a module configured to build a voice model of a respective caller while transcribing voicemail messages.

14. The system of claim 13, the system further comprising a module configured to transcribe additional voicemail messages from the respective caller with the voice model.

15. The system of claim 9, the system further comprising a module configured to store transcribed voicemail messages for later retrieval.

16. A tangible computer-readable medium storing a computer program having instructions for automatically transcribing voicemail, the instructions comprising:

receiving a plurality of voicemail messages from callers;

identifying for each voicemail message in the plurality of voicemail messages a first frequency with which the respective caller leaves voicemails;

identifying for each voicemail message in the plurality of voicemail messages a second frequency with which a user requests transcription of each voicemail;

assigning a priority ranking to each voicemail message in the plurality of voicemail messages based on the respective first frequency and the respective second frequency; and transcribing untranscribed voicemail messages with a highest priority ranking.

17. The tangible computer-readable medium of claim 16, the instructions further comprising repeatedly transcribing next highest ranking untranscribed voicemail messages until no further untranscribed voicemail messages remain.

18. The tangible computer-readable medium of claim 16, the instructions further comprising:

establishing a priority ranking threshold; and repeatedly transcribing a next highest ranking untranscribed voicemail message until no further untranscribed voicemail messages remain above the priority ranking threshold.

19. The tangible computer-readable medium of claim 16, the instructions further comprising:

generating speaker-specific syllable libraries while transcribing voicemail messages;

receiving incoming text-based messages from a speaker; and reading aloud the incoming text-based message using the speaker-specific syllable library associated with the speaker.

20. A computer-implemented method of automatically transcribing voicemail, the method comprising:

receiving a plurality of voicemail messages from callers;

identifying for each voicemail message in the plurality of voicemail messages a first frequency with which the respective caller leaves voicemails;

identifying for each voicemail message in the plurality of voicemail messages a second frequency with which a user requests transcription of each voicemail;

assigning a priority ranking to each voicemail message in the plurality of voicemail messages based on the respective first frequency and the respective second frequency;

marking each voicemail message with a time entry stamp indicating a date and time of entry into a queue;

marking each voicemail message with a waiting stamp indicating a date and time when to take action regarding the respective voicemail;
scanning the respective waiting stamps of untranscribed voicemail messages during an off-peak time;
selecting untranscribed voicemails stored in the queue past a waiting threshold;
identifying key words in selected untranscribed voicemails based on a personal interest profile unique to a respective voicemail recipient; and
transcribing the identified key words in each selected untranscribed voicemail.

* * * * *

UNITED STATES PATENT AND TRADEMARK OFFICE
CERTIFICATE OF CORRECTION

PATENT NO.         : 8,199,888 B2                                    Page 1 of 1
APPLICATION NO.    : 12/328370
DATED              : June 12, 2012
INVENTOR(S)        : Hisao M. Chang and Xiaolian Bi It is certified that error appears in the above-identified patent and that said Letters Patent is hereby corrected as shown below:

In the Claims

Col. 8, Claim 1, line 63, change "with which the" to --with which a--

Col. 9, Claim 1, line 2-3, change "the respective first frequency and the respective second frequency" to --the first frequency and the second frequency--

Col. 9, Claim 5, line 29, change "transcribing voicemail messages" to --transcribing the untranscribed voicemail messages--

Col. 9, Claim 9, line 45, change "which the respective" to --which a respective--

Col. 9, Claim 9, line 53, change "the respective first" to --the first--

Col. 9, Claim 9, line 54, change "respective second frequency" to --second frequency--

Col. 10, Claim 13, line 10, change "model of a respective" to --model of the respective--

Col. 10, Claim 13, line 11, change "transcribing voicemail" to --transcribing the untranscribed voicemail--

Col. 10, Claim 16, line 23, change "with which the" to --with which a--

Col. 10, Claim 16, lines 29-30, change "based on the respective first frequency and the respective second frequency" to --based on the first frequency and the second frequency--

Col. 10, Claim 19, line 51, change "message using the" to --message using a--

Col. 10, Claim 19, line 52, change "library associated" to --library of the speaker-specific syllable libraries which is associated--

Col. 10, Claim 20, line 58, change "with which the" to --with which a--

Col. 10, Claim 20, lines 64-65, change "based on the respective first frequency and the respective second frequency" to --based on the first frequency and the second frequency--

Col. 11, Claim 20, line 3, change "the respective voicemail" to --each respective voicemail--

Col. 11, Claim 20, line 4, change "scanning the respective waiting" to --scanning waiting--

Signed and Sealed this
Seventeenth Day of June, 2014

Michelle K. Lee
*Deputy Director of the United States Patent and Trademark Office*